(12) United States Patent
Stauffer et al.

(10) Patent No.: US 8,505,604 B2
(45) Date of Patent: Aug. 13, 2013

(54) LASER HEAD AND METHOD OF CONNECTING TUBULAR PARTS BY THE LASER TRANSMISSION METHOD

(75) Inventors: Erich Stauffer, Luzern (CH); Pius Barmet, Horw (CH); Oliver Hinz, Kägiswil (CH); Michael Scheidt, Wetzkion ZH (CH); Ulrich Gubler, Rotkreuz/ZG (CH)

(73) Assignee: LEISTER Technologies AG, Kagiswil (CH)

( * ) Notice: Subject to any disclaimer, the term of this patent is extended or adjusted under 35 U.S.C. 154(b) by 169 days.

(21) Appl. No.: 13/060,287

(22) PCT Filed: Aug. 20, 2009

(86) PCT No.: PCT/EP2009/006025
§ 371 (c)(1),
(2), (4) Date: Feb. 23, 2011

(87) PCT Pub. No.: WO2010/022886
PCT Pub. Date: Mar. 4, 2010

(65) Prior Publication Data
US 2011/0146903 A1 Jun. 23, 2011

(30) Foreign Application Priority Data
Aug. 28, 2008 (EP) .................................. 08015157

(51) Int. Cl.
*B32B 37/02* (2006.01)
(52) U.S. Cl.
USPC ..................................... 156/379.6; 156/272.2
(58) Field of Classification Search
USPC .............. 156/272.2, 272.8, 379.6; 219/121.6, 219/121.63, 121.64
See application file for complete search history.

(56) References Cited

U.S. PATENT DOCUMENTS

| 7,205,551 B2 | 4/2007 | Uno |
| 7,368,681 B2 | 5/2008 | Mikhailov |

(Continued)

FOREIGN PATENT DOCUMENTS

| DE | 10 2004 003 696 A1 | 8/2005 |
| JP | 55021232 A | 2/1980 |

(Continued)

OTHER PUBLICATIONS

International Search Report for International Application No. PCT/EP2009/006025 mailed Jan. 22, 2010.

*Primary Examiner* — Daniel McNally
(74) *Attorney, Agent, or Firm* — Renner, Otto, Boisselle & Sklar, LLP

(57) ABSTRACT

The invention relates to a laser head (11) for connecting tubular parts (1, 3, 12, 13) by the laser transmission method and to a method of connecting the tubular parts (1, 3, 12, 13) by means of the laser head (11). The laser head (11) and the method that can be performed by the laser head (11) are suitable in particular for connecting a connecting element or branching element (1) to one end of a plastic pipe (3). The laser head (11) makes simultaneous welding possible and has at least two shell parts (16) that can be radially separated from each other so that the laser head (11) can be placed around a connecting section (4) or a connecting region (15) of the tubular parts (1, 3, 12, 13). A number of laser sources (17) are arranged in the shell parts (16) in such a way that the laser beams (7) emerging from the laser sources (17) overlap at the connecting section (4) or at the connecting region (15) of the parts (1, 3, 12, 13).

6 Claims, 2 Drawing Sheets

(56) References Cited

U.S. PATENT DOCUMENTS

| | | | |
|---|---|---|---|
| 2002/0100540 A1* | 8/2002 | Savitski et al. | 156/157 |
| 2005/0230039 A1* | 10/2005 | Austin et al. | 156/272.8 |
| 2008/0135170 A1* | 6/2008 | He et al. | 156/272.8 |

FOREIGN PATENT DOCUMENTS

| | | |
|---|---|---|
| JP | 01-151464 A | 6/1989 |
| JP | 4191592 A | 7/1992 |
| JP | 2004-114456 A | 4/2004 |
| JP | 2005-193614 A | 7/2005 |
| JP | 2006-085919 A | 3/2006 |
| JP | 2007-260957 A | 10/2007 |
| JP | 2008-001022 A | 1/2008 |
| WO | 97/21953 | 6/1997 |
| WO | 2005/097471 A | 10/2005 |
| WO | 2005/113049 A | 12/2005 |

\* cited by examiner

LASER HEAD AND METHOD OF CONNECTING TUBULAR PARTS BY THE LASER TRANSMISSION METHOD

TECHNICAL FIELD OF THE INVENTION

The invention relates to a laser head for connecting tubular parts by the laser transmission method and to a method of connecting the connecting element or branching element with ends of a plastic pipe by means of the laser transmission welding method.

It is known to simultaneously weld tubular parts made of thermoplastic synthetic material that butt at their face sides or overlap at their ends by means of the laser transmission welding method. Simultaneous welding can be accomplished quasi-simultaneously with a single laser light source or truly simultaneously with a number of laser light sources. With the quasi-simultaneous laser welding method, the connecting point of the work pieces is surrounded by an annular beam deflecting device that is continuously scanned in a circular fashion by a laser beam emitted by the laser light source and deflects the laser beam at a right angle to the connecting spot. With the truly simultaneous laser welding method, the laser light sources are arranged in a circle around the connecting spot of the work pieces, with the laser beams overlapping at the connecting spot.

DISCUSSION OF RELATED ART

The patent disclosure DE 10 2004 003 696 A1 is cited as an example for simultaneous welding by means of several laser light sources. This publication discloses a device for the simultaneous welding of work pieces and comprises a number of laser light sources, with the laser light sources being arranged in a housing in such a way that the laser beams emitted by the laser light sources generate at least one region into which the work pieces can be introduced, said region being located further inside in the radial direction, and having an essentially constant energy density section-by-section. With long work pieces in particular, introducing and clamping the work pieces in the center of the laser light sources proved to be difficult.

Starting with the prior art described above, the invention addresses the problem of proposing a method for connecting the end section of a pipe with a connecting section of a connecting element or branching element that is distinguished by significantly shorter welding times while providing an operationally reliable, liquid and gas tight welded connection, with special emphasis on a correctly welded connection between the outer circumferential surface of the pipe and the associated inner circumference of the connecting element or branching element.

SUMMARY OF THE INVENTION

According to the invention, this problem is solved by a laser head with the characteristics of claim 1 and by a connecting process with the characteristics of the related claim 6. Additional advantageous embodiments are given in the related claims.

The laser head according to the invention for connecting tubular parts by means of the laser transmission welding method permits the simultaneous welding of the tubular parts. The tubular parts can be welded to each other in a butting or overlapping configuration. For non-overlapping welding, the tubular parts to be connected have an identical cross-section at the end sections, while being of identical cross-sectional contour for overlap welding, with the contours being dimensioned in such a way that one of the tubular parts can be inserted with its end section into the face side of the end section of the other tubular part, where it can be seated by means of a sliding fit or a light press fit. For this purpose, a connecting element in the form of a connecting sleeve may be molded onto an end section of one of the tubular parts, or a connecting element or branching element matching the tubular part may be slid onto the tubular part and be welded to it by means of the laser transmission welding method.

In order to permit simultaneous welding in a simple way, the laser head according to the invention preferably completely surrounds a connecting section and/or a connecting region of the parts, with the laser head having at least two shell parts that can be separated radially from each other and in which a number of laser sources are arranged in such a way that the laser beams emerging from the laser sources overlap on the connecting section or in the connecting region. Such embodiments of the invention are preferred where the overlap in the connection region or on the connecting section is gapless in the circumferential direction of the parts to be connected and/or where the laser head comprises two half shells.

Because the shell parts can be separated perpendicular to the longitudinal direction of the tubular parts to be connected, the divisible laser head can be placed around the welding location regardless of the pipe length of the parts to be connected, thereby accepting the connecting region of the parts to be connected in a holding chamber of the laser head that is ideally located in the center of the laser head. By means of integrated optics, the laser beams emerging from the shell parts can be shaped, guided, and focused in such a way that the laser beams from the individual laser sources overlap at the welding seam to be produced. This ensures a homogeneous energy distribution of the laser light over the entire circumference of the welding seam. As laser sources, it is possible to use either integrated individual laser sources or integrated laser bars, or laser sources placed in pieces of optical conductors.

In one embodiment of the invention, the diameter of the holding chamber is shaped in such a way, or the holding chamber is equipped with such devices that the shell parts press the parts to be connected radially so that it is also possible to connect such tubular parts, without problems, at their circumference with a sliding fit rather than a press fit.

It is also possible, of course, to use the divisible laser head to connect by means of laser welding tubular parts with a press fit of the axially overlapping end sections. For this purpose, the laser beams are preferably directed at a bridging element that is molded onto one of the parts to be connected and bridges a radial annular gap between the overlapping end sections of the tubular parts. In its simplest form, for example, the bridging element producing the press fit may consist of an annular collar that is provided to protrude from and circle the inner circumference of the overlapping end section, and is low in height in the radial direction.

In principle, instead of one of the tubular parts, a connecting element or branching element may be connected to the end of the other tubular part, with the connecting element or branching element having, as a bridging element of the type referred to above, a hollow cylindrical connection section for accepting—and preferably for producing a sealing attachment of—the insertable pipe end of the other tubular part. Despite the press fit, the annular collar permits the simple axial insertion of the pipe end into the connecting element or branching element. The press fit between the connecting element or branching element is sufficient for a reliable welded connection of the outer circumference of the pipe end section to the annular collar. The bridging element partially bridges an annular gap that is formed between the pipe end section of an inserted pipe and a connecting section of the connecting element or branching element.

Ideally, the outside diameter of the pipe end section is only slightly larger than the inside diameter of the annular collar. The insertion of the pipe end into the connecting element or branching element with the annular collar arranged in the connection section can be simplified by a longer or shorter bevel at the face end of the pipe. When the pipe is inserted into the connecting section, the annular collar is preferably slightly deformed or compressed, which produces a press fit of the pipe end section and the bridging element. Depending on the wall thickness of the pipe to be connected in relation to the wall thickness of the connecting section in the region of the annular collar, a radial deformation of the pipe end section and/or the connecting section may also occur.

According to the method according to the invention for connecting a connecting element or branching element with one end of a pipe consisting of thermoplastic synthetic material by means of the laser transmission welding method, the following process steps are provided for. Here, the connecting element or branching element comprises a hollow cylindrical connecting section to accept the pipe end that can be inserted in order to accomplish a sealing attachment, with the pipe end section being insertable into the connecting section with a press fit, for simultaneous welding with a laser head, for example the laser head described above.

First, a pipe with a pipe end section and a connecting element or branching element are provided, with the connecting section of the latter comprising at the inner circumference a molded-on annular bridging element for the partial bridging of the annular gap, where the bridging element produces the press fit with an outer circumference of the pipe section. Then, the end of the pipe is inserted into the connecting section of the connecting element or branching element, which causes a press fit to be generated between the bridging element of the connecting section and the pipe end section. Following that, radially separable shell parts of the laser head are arranged around the connecting element or branching element that completely enclose at least the connecting section. After that, the connecting section, preferably the bridging element, is exposed to laser beams that emerge from laser sources located in the shell parts. The laser beams are directed onto the connecting section in such a way that they overlap in the connecting region and weld the bridging element to the outer circumference of the pipe end section under radial contact pressure.

Below, the invention is explained in detail with reference to an embodiment shown in the drawing. Additional characteristics of the invention are given in the following description of an embodiment of the invention in conjunction with the claims and the attached drawing. The individual characteristics of the invention may be realized either individually by themselves or in combinations of several in different embodiments of the invention. In a schematic section view,

DETAILED DESCRIPTION OF THE INVENTION

Figure 1:
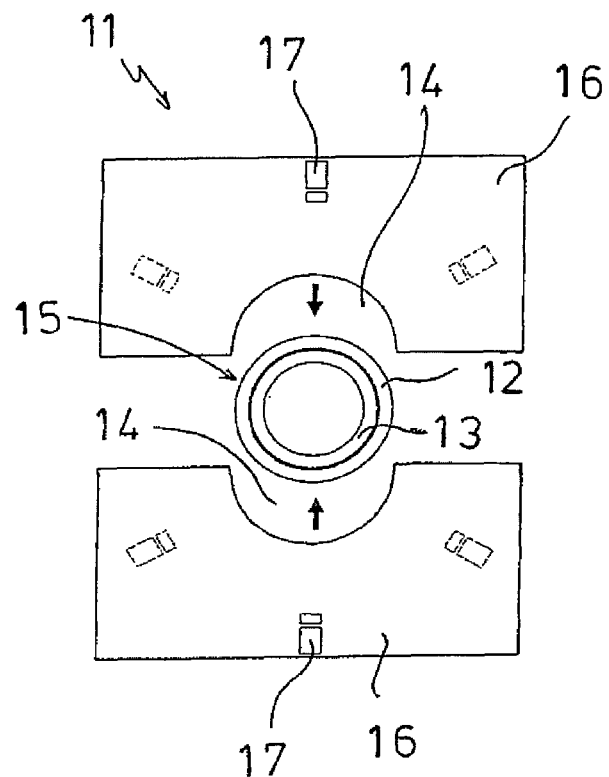
FIG. 1 shows a divisible laser head according to the invention with separated half shells.
Figure 2:
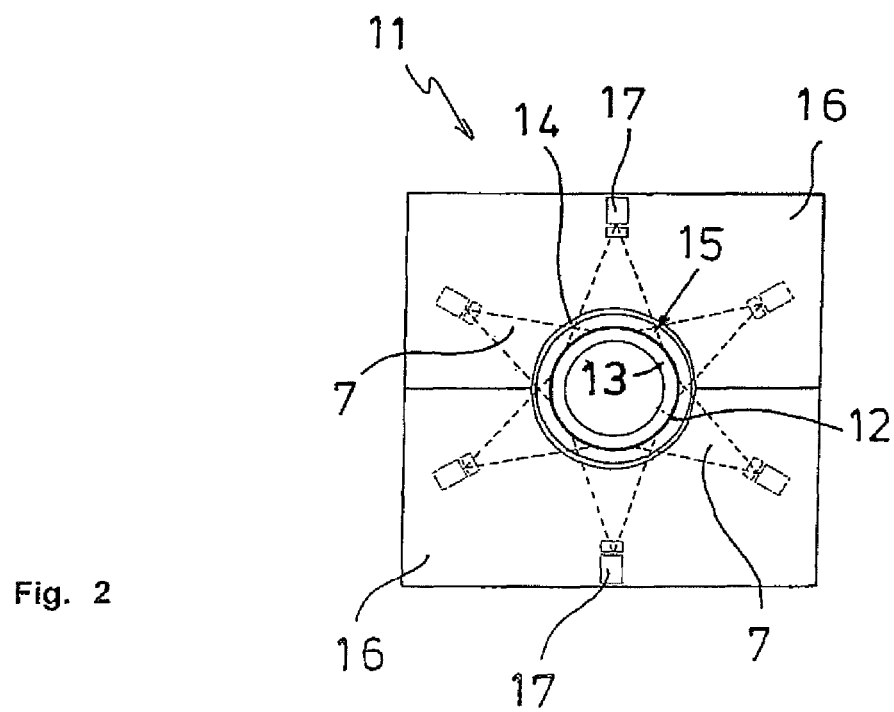
FIG. 2 shows the laser head in FIG. 1 with assembled half shells during the welding process.

FIGS. 1, 2 show a laser head 11 according to the invention for connecting tubular parts 12, 13 by the laser transmission welding method. By means of the laser head 11, for example, it is also possible to weld, thereby producing a seal, the connecting section 1 shown in FIG. 3 to the pipes 3 along the inner circumference. The welding of the parts 1, 3 and 12, 13, respectively, takes place in a central holding chamber 14 of the laser head 11 that encloses a connecting region 15 of the tubular parts 12, 13 or a connecting section 4 of the parts 1, 3. As FIG. 1 shows, the laser head 11 comprises two half shells 16 that can be radially separated from each other so that the laser head 11, as shown in FIG. 2, can be placed around the connecting section 4 of the parts 1, 3 or around the connecting region 15 of the parts 12, 13.

In the half shells 16, six laser sources 17 are arranged in a circular arrangement and evenly distributed around the holding chamber 14. The laser beams 7 emerging from the laser sources 17 are directed radially towards the holding chamber 14 and overlap on the connecting section 4 or the connecting region 15 at the parts 1, 3, 12, 13 that are to be connected and are arranged in the holding chamber 14. This permits a simultaneous welding of the tubular parts 1, 3 and 12, 13, respectively.

Figure 3:
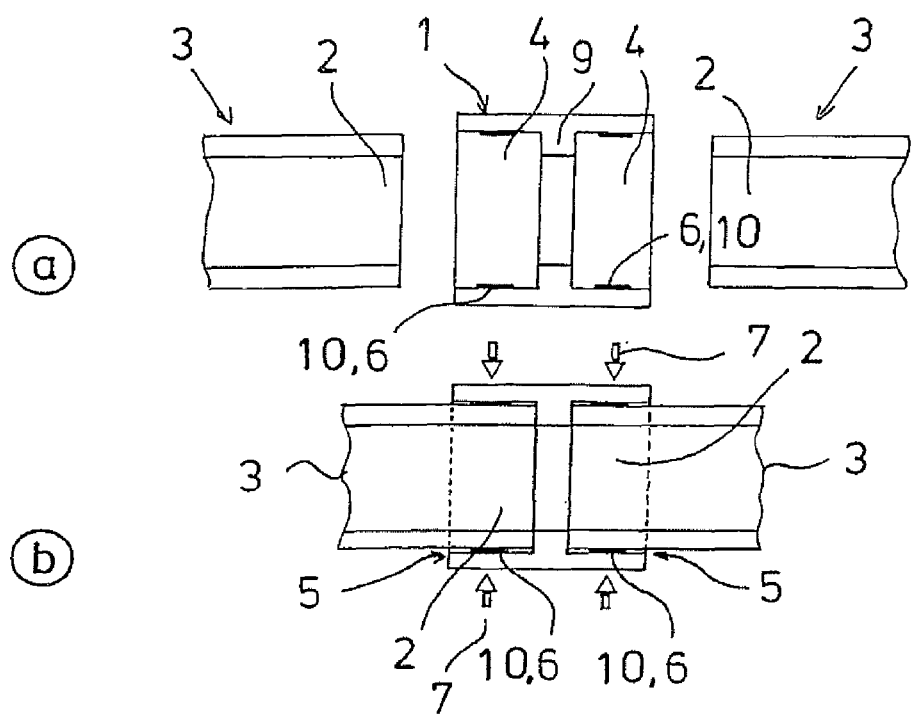
FIG. 3 a connecting element with bridging element for connecting two pipe ends by the laser transmission welding method.

As examples for parts to be welded, FIG. 3 shows a substantially tubular connecting element 1 to be connected with pipe end sections 2 of a pipe 3 consisting of thermoplastic synthetic material by means of the laser transmission welding method. At each end, the connecting element 1 has a hollow cylindrical connecting section 4 for accepting the insertable pipe for the sealing attachment thereof. Together with connecting section 4, the pipe end section 2 forms an annular gap 5, with a bridging element 6, which is molded onto the inner circumference of the connecting section and which has the shape of an annular collar that protrudes in the radial direction and which is low in height, being provided for the partial bridging of the annular gap 5.

In relation to the outer diameter of the pipe end section 2, an interior diameter of the annular collar 6 is slightly smaller so that a press fit is produced between the pipe end section 2 of the pipe 3 and the connecting section 4 of the connecting element 1 in the area of the annular collar 6 as soon as the pipe 3 is inserted into the connecting element 1. This makes it possible to weld the annular collar 6 to the pipe end section 2 under radial contact pressure by means of laser beams 7 in the transmission method with a liquid and gas-tight seal.

FIG. 3a shows the pipes 3 and the connecting element 1 prior to the axial insertion, FIG. 3b shows them in inserted condition. Centered on the inner circumference, the connecting element 1 comprises an annular step 9 that serves as a stop for the pipes 3 to be inserted. For a sealing attachment to the connecting section 4 of the connecting element 1, the pipe end sections 2 of the pipes 3 do not need to be welded with their face sides to the annular step 9. A circular weld along the bridging element 6 is sufficient. For welding the pipe end sections 2 to the connecting sections 4 by means of the laser transmission welding method from the outside it is mandatory that the connecting element 1 be made of a synthetic material that is transparent to laser light. In this case, the laser light passes the connecting section 4 substantially unimpeded.

In the simplest case, the plastification of the bridging element 6 that is to be welded to the pipe end section 2 is accomplished by heating the pipe 3 by means of laser light. For this purpose, the pipe 3 needs to consist of a thermoplastic synthetic material that absorbs the laser beams 7. In order to produce the welded connection, the pipe end section 2 is heated up to the melting point in the area of the annular collar 6, with the melted material plastifying the annular collar 6 and combining with it so that a material-to-material connection exists between the pipe 3 and the connecting element 1 after the melted material solidifies.

It is also possible to weld pipes 3 that are transparent to laser light to the connecting element 1. For this purpose, the annular collar 6 is formed by an absorption layer 6 that absorbs laser light and can be melted by the laser beams 7 and plastifies the pipe end section 2 in the area of the absorption layer 6. The absorption layer 6, preferably connected with a material-to-material connection to the connecting section 4, may be relatively thin, i.e. approximately 0.1 to 0.5 mm. It may be produced by means of a 2K spray process, for example.

The invention claimed is:

1. A laser head for connecting tubular parts by the laser transmission welding method, wherein the laser head comprises at least two shell parts that can be separated radially from each other and enclose a holding chamber for the parts to be welded, with a number of laser sources being arranged in the shell parts in such a way that the laser beams emerging from the laser sources overlap in the holding chamber and that the welding of the parts in the holding chamber is performed simultaneously, with the holding chamber (14) enclosing a connecting section or a connecting region of the parts during the welding process.

2. The laser head according to claim 1, wherein the laser beams overlap without gaps on the connecting section or the connecting region of the parts to be connected during the welding process.

3. The laser head according to claim 1, wherein the shell parts that can be separated radially are two half shells.

4. The laser head according to claim 1, wherein, in the connecting region, the shell parts exert radial pressure on the parts to be connected.

5. The laser head according to claim 1, wherein the laser beams are directed onto a bridging element that bridges a radial annular gap between two axially overlapping end sections of the tubular parts.

6. A method for connecting a connecting element or branching element with one end of a pipe consisting of thermoplastic synthetic material by means of the laser transmission welding method, with the connecting element or branching element comprising a hollow cylindrical connecting section for accepting the insertable pipe end in a sealing attachment that, together with the pipe end section of the inserted pipe forms radially an annular gap and is welded simultaneously by means of a laser head, with provision of a pipe with a pipe end section, provision of a connecting element or branching element whose connecting section comprises a circular bridging element molded on the inner circumference for partial bridging of the annular gap, with the bridging element generating a press fit with the outer circumference of the pipe end section, insertion of the pipe end section into the connecting section of the connecting element or branching element, with a press fit being generated between the bridging element of the connecting section and the pipe end section, arrangement of radially separable shell parts of the laser head around the connecting element or branching element, completely enclosing at least the connecting section, irradiation of the connecting section, preferably the bridging element, by means of laser beams that emerge from the laser sources arranged in the shell parts and are directed at the connecting section in such a way that they overlap in the connecting region, and welding of the bridging element to the outer circumference of the pipe end section under radial contact pressure generated by the press fit.

\* \* \* \* \*